US011645082B2

(12) United States Patent
Hudayfi et al.

(10) Patent No.: US 11,645,082 B2
(45) Date of Patent: May 9, 2023

(54) PROGRAMMING LANGUAGE TRIGGER MECHANISMS FOR PARALLEL ASYNCHRONOUS ENUMERATIONS

(71) Applicant: Microsoft Technology Licensing, LLC, Redmond, WA (US)

(72) Inventors: Adir Hudayfi, Eilat (IL); Gal Tamir, Avichayil (IL); Izhak Mashiah, Qiryat Ono (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 90 days.

(21) Appl. No.: 16/913,285

(22) Filed: Jun. 26, 2020

(65) Prior Publication Data

US 2021/0406029 A1 Dec. 30, 2021

(51) Int. Cl.
*G06F 9/50* (2006.01)
*G06F 9/38* (2018.01)
*G06F 8/30* (2018.01)
*G06F 9/455* (2018.01)

(52) U.S. Cl.
CPC .............. *G06F 9/3871* (2013.01); *G06F 8/31* (2013.01); *G06F 9/3836* (2013.01); *G06F 9/45558* (2013.01); *G06F 9/5038* (2013.01)

(58) Field of Classification Search
CPC .................................................... G06F 9/5027
See application file for complete search history.

(56) References Cited

U.S. PATENT DOCUMENTS

| 8,549,506 | B2 | 10/2013 | Meijer et al. |
| 8,607,206 | B2 | 12/2013 | Freeman et al. |
| 10,157,055 | B2 | 12/2018 | Tamir et al. |
| 2008/0005737 | A1* | 1/2008 | Saha ............... G06F 9/3004 718/100 |
| 2010/0333091 | A1 | 12/2010 | Lin et al. |

(Continued)

FOREIGN PATENT DOCUMENTS

WO 2012112400 A2 8/2012

OTHER PUBLICATIONS

Hamon, Elizabeth Anne, "Enhancing Asynchronous Parallel Computing", In Dartmouth Computer Science Technical Report TR2003-460, Jun. 2003, 38 Pages.

(Continued)

*Primary Examiner* — Jacob Petranek
(74) *Attorney, Agent, or Firm* — Newport IP, LLC; Jacob P. Rohwer

(57) ABSTRACT

Embodiments described herein are directed to a programming language trigger mechanism. The trigger mechanism is a small piece of code that a software developer utilizes in a computer program. The trigger mechanism enables computing operations or tasks to be performed asynchronously and in a parallel fashion. In particular, logic (e.g., operations or tasks) associated with the trigger mechanism are provided to a plurality of resources for processing in parallel. Each resource asynchronously processes the task provided thereto and asynchronously provides the result. The results are asynchronously returned as an enumeration. The enumeration enables the software developer to enumerate through the returned elements as a simple stream of results as they are calculated.

20 Claims, 7 Drawing Sheets

(56) References Cited

U.S. PATENT DOCUMENTS

| | | | |
|---|---|---|---|
| 2019/0012256 A1* | 1/2019 | Poppe | G01R 31/31912 |
| 2019/0187965 A1* | 6/2019 | Toub | G06F 8/4441 |
| 2019/0220326 A1* | 7/2019 | Peter | G06F 9/485 |
| 2020/0110676 A1* | 4/2020 | Volos | G06F 11/203 |

OTHER PUBLICATIONS

Krauweel, Marco, "Concurrent and Asynchronous JavaScript Programming using Reo", In Thesis of Open University of the Netherlands, Feb. 21, 2017, 89 Pages.

Rademacher et al., "Towards a Viewpoint-Specific Metamodel for Model-driven Development of Microservice Architecture", In Journal of Computing Research Repository, Apr. 2018, 8 Pages.

Steendam, Lisa, "Parallel and Asynchronous Programming in Java 8", Retrieved from: https://dzone.com/articles/parallel-and-asynchronous-programming-in-java-8, May 11, 2018, 7 Pages.

"Run Async Method 8 Times in Parallel-Stack Overflow", Retrieved From: https://stackoverflow.com/questions/14673728/run-asyncmethod-8-times-in-parallel, May 23, 2017, 6 Pages.

Alexandru, Puiu, "Parallel Foreach Async in C#", Retrieved From: https://medium.com/@alex.puiu/parallel-foreach-async-in-c-36756f8ebe62, Jan. 6, 2020, 8 Pages.

"International Search Report and Written Opinion Issued in PCT Application No. PCT/US21/028034", dated Jul. 28, 2021, 12 Pages.

Stephen, Toub, "Implementing a Simple ForEachAsync, Part 2", Retrieved From: https://devblogs.microsoft.com/ofxteam/implementing-a-simple-foreachasync-part-2/, Mar. 5, 2012, 6 Pages.

Stephen, Toub, "Implementing a simple ForEachAsync", Retrieved From: https://web.archive.org/web/20120310233848/https://blogs.msdn.com/b/pfxteam/archive/2012/03/04/10277325.aspx, Mar. 4, 2012, 1 Page.

* cited by examiner

PROGRAMMING LANGUAGE TRIGGER MECHANISMS FOR PARALLEL ASYNCHRONOUS ENUMERATIONS

BACKGROUND

Concurrent programming is widely used in high-level programming in various ways. It helps to improve the speed and the resource utilization of any system, while drastically making it more complex. Concurrent programming includes two types of approaches. The first approach is parallel programming, where tasks are distributed between multiple compute resources. The second approach is asynchronous programming, which enables a compute resource to concurrently work on different tasks in a non-blocking manner. While each have their respective benefits, generally only a single approach is utilized in isolation, as practically combining the two approaches is exceedingly difficult, and no high-level programming language or framework supports the combination of these approaches out of the box in a straightforward way.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums described herein are directed to a programming language trigger mechanism. The trigger mechanism may be a small piece of code (e.g., a single keyword or line of code) that a software developer utilizes in a computer program. When utilized in a computer program, the trigger mechanism enables logic (e.g., operations or tasks, such as calculations) to be performed asynchronously and in a parallel fashion. In particular, operations or tasks associated with the trigger mechanism are provided to a plurality of resources for processing in parallel. Each resource asynchronously processes the task provided thereto and asynchronously provides the result. The results are asynchronously returned as a stream of elements, also known as an enumeration. The enumeration enables the software developer to enumerate through the elements as a simple stream of results as they are calculated. The techniques described herein advantageously enable a developer to run logic in parallel, while enumerating on the results asynchronously without being concerned about resource (e.g., thread) safety. The compact nature of the triggering mechanism dramatically simplifies the complexity of designing and implementing programs that behave in both in an asynchronous and parallel fashion.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
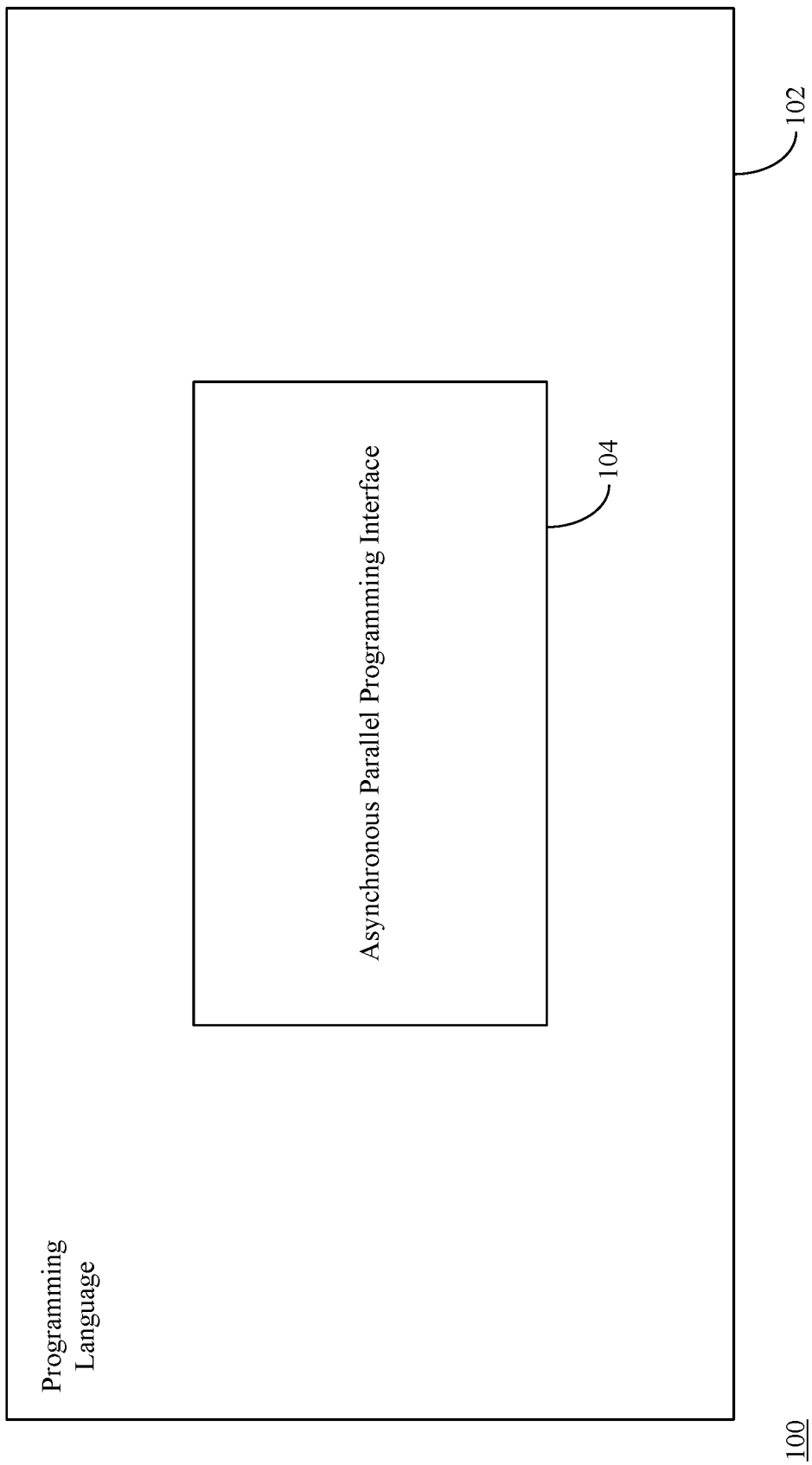
FIG. 1 depicts a programming environment in accordance with an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

For the sake of brevity, certain embodiments described herein are described with respect to the Microsoft® .NET programming language, published by Microsoft Corporation of Redmond, Wash. However, as would be clear to any person skilled in the art having the benefit of this disclosure, this is just one possible embodiment. The embodiments described herein may be applied to other programming languages.

II. Example Embodiments

While solutions are available to run asynchronous parallel code, it is very difficult to implement, as they require a specific design or approach. The complexity of the implementation often leads to many bugs and deadlocks. To overcome such challenges, embodiments introduce a trigger mechanism for a programming language. The trigger mechanism may be a small piece of code (e.g., a single keyword or line of code) that a software developer utilizes in a computer program. When utilized in a computer program, the trigger mechanism enables logic (e.g., operations or tasks, such as calculations) to be performed asynchronously and in a parallel fashion. In particular, logic associated with the trigger mechanism is provided to a plurality of resources for processing in parallel. Each resource asynchronously processes the task provided thereto and asynchronously provides the result. The results are asynchronously returned as a stream of elements, also known as an enumeration. The enumeration enables the software developer to enumerate through the elements as a simple stream of results as they are calculated. The techniques described herein advantageously enable a developer to run logic in parallel, while enumerating on the results asynchronously without being concerned about resource (e.g., thread) safety. The compact nature of the triggering mechanism dramatically simplifies the complexity of designing and implementing programs that behave in both in an asynchronous and parallel fashion.

The reduction in complexity advantageously reduces the number of bugs or deadlocks in the code, thereby enabling programs to run more efficiently. Moreover, by combining both forms of concurrent programming, operations are executed more quickly and efficiently, which advantageously decreases the calculation time of the operations (i.e., the results are returned much more quickly). Lastly, the size of the computer program is reduced via the trigger mechanism (i.e., complex code comprising lines and lines of code are reduced to a single line), which advantageously reduces the memory footprint of the computer program.

FIG. 1 depicts a programming environment 100 in accordance with an example embodiment. Programming environment 100 includes a programming language 102 that provides an interface by which a software developer may incorporate a trigger mechanism that enables computing operations or tasks to be performed asynchronously and in a parallel fashion. As shown in FIG. 1, programming language 102 is enhanced with an asynchronous parallel programming interface 104 that allows the software developer to include a trigger mechanism that enables computing operations or tasks to be performed asynchronously and in a parallel fashion.

In accordance with an embodiment, asynchronous parallel programming interface 104 exposes the trigger mechanism to a software developer as a reserved word or keyword of programming language 102. The software developer may associate logic (e.g., code) with the reserved word or keyword in the software developer's program or source code. The logic may specify a plurality of tasks or operations that are to be executed in an asynchronous and parallel fashion.

In accordance with another embodiment, asynchronous parallel programming interface 104 exposes the trigger mechanism to a software developer as a method of programming language 102. The method may be part of programming language 102 itself or may be part of a framework on which programming language 102 is built. The method may also be incorporated into programming language 102 via a software package added to programming language 102. The software developer may associate logic with the method by making a call to the method in the source code and providing the logic as an input to the method call.

Figure 2:
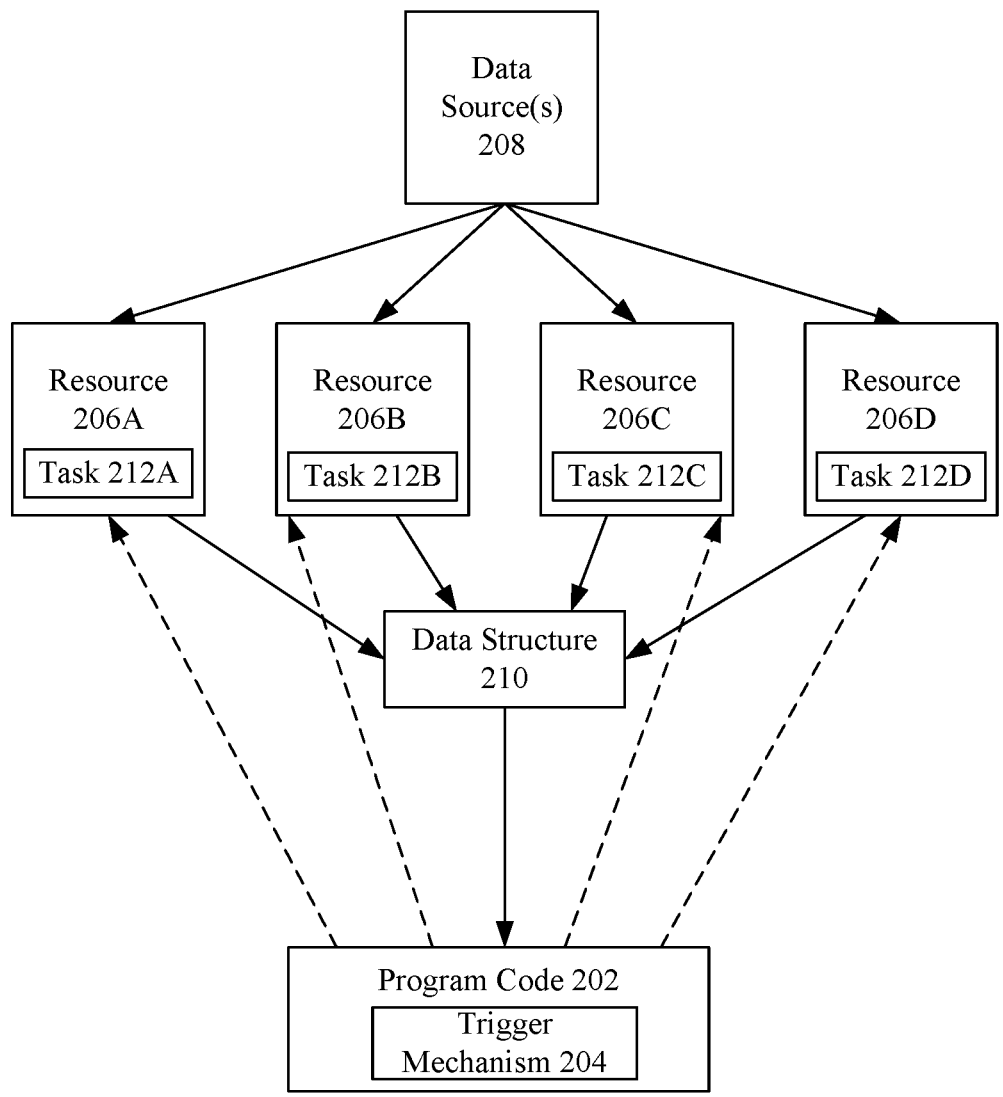
FIG. 2 depicts a block diagram of a system for executing code in an asynchronous and parallel fashion in accordance with an example embodiment.

During execution of the program, the plurality of tasks or operations associated with the trigger mechanism are performed in an asynchronous and parallel fashion. For instance, FIG. 2 depicts a block diagram of a system 200 for executing tasks (e.g., tasks 212A-212D) in an asynchronous and parallel fashion in accordance with an example embodiment. As shown in FIG. 2, system 200 comprises a computer program code 202, a plurality of resources 206A-206D, a data structure 210, and one or more data source(s) 208. Program code 202 comprises a trigger mechanism 204. Data source(s) 208 may comprise a combination of data source(s) local to the computing device on which program code 202 executes and/or data source(s) remotely-located from the computing device. For instance, data source(s) 208 may be implemented in another computing device or implemented via a cloud-based environment (e.g., in a node or server maintained by the cloud-based environment) communicatively coupled to the computing device on which program code 202 executes.

During execution of program code 202, when trigger mechanism 204 is encountered, the logic associated therewith (e.g., the plurality of tasks or operations to be performed) is distributed between resources 206A-206D. Such tasks are shown tasks 212A-212D. For example, in a scenario in which data associated with different days is to be analyzed, data for each day may be provided to a particular resource of resources 206A-206D. Each of resources 206A-206D may obtain the data to be analyzed from data source(s) 208 and perform its associated task of tasks 212A-212D, as specified by the logic associated with trigger mechanism 204, on the obtained data. In accordance with an embodiment, each of resources 206A-206D is a computing thread executing on the computing device on which program code 202 executes. In accordance with another embodiment, each of resources 206A-206D comprises a node maintained by a cloud-based environment (or a thread thereof). An example of a cloud-based environment includes, but is not limited to, Microsoft® Azure® cloud computing platform, owned by Microsoft Corporation of Redmond, Wash., although this is only an example and not intended to be limiting. It is noted that while FIG. 2 depicts four resources 206A-206N, any number resources may be utilized to execute the logic in a parallel fashion.

Each of resources 206A-206D is configured to execute its task of tasks 212A-212D asynchronously. For example, while a resource of resources 206A-206D waits for a particular task to be completed, the resource may be utilized to perform other tasks. That is, each of resources 206A-206D is not blocked from performing other tasks or operations while waiting for particular task or operation to be completed.

Each resource of resources 206A-206D returns the result of the completed task or operation performed thereby asynchronously, as soon as they are complete, to data structure 210. Thus, the results may be received by data structure 210 in any order. That is, one resource of resources 206A-206D does not wait for another resource of resources 206A-206D to provide results before providing its results. For example, resource 206B may return results before resource 206A, resource 206D may return results before resource 206B, etc. Data structure 210 stores the results received from each of resources 206A-206D.

Data structure 210 may also be utilized to share or pass data between resources 206A-206D. For example, a first resource of resources 206A-206D may write data to data structure 210, and a second resource of resources 206A-206D may read data from data structure 210. This advantageously maximizes the utilization of resources 206A-206D.

In accordance with an embodiment, data structure 210 is a thread-safe queue or any other suitable thread-safe data structure, which ensures that when a resource of resources 206A-206D is modifying or reading shared data, no other resource of resources 206A-206D can modify that data.

In an embodiment in which program code 202 it implemented using the Microsoft® .NET programming language, data structure 210 is created using the static Channel class, which, generally, can be used to create a data structure (e.g., data structure 210) for passing data between producers and consumers (e.g., resources 206A-206D and/or program code 202) asynchronously.

The results stored in data structure 210 may be returned to program code 202 as a stream of batch elements, also referred to as an asynchronous (i.e., async) enumeration (e.g., an enumerated list that is populated asynchronously). The asynchronous enumeration may be iterated though as a stream of results as they are calculated. In accordance with an embodiment in which program code 202 is implemented in the .NET programming language, the asynchronous enumeration may be achieved using the IAsyncEnumerable<T> interface, which exposes an enumerator that provides asynchronous iteration over values of a specified type T. In accordance with such an embodiment, trigger mechanism 204 may be included within the interface (i.e., trigger mechanism 210 may be specified within the interface).

In an embodiment in which trigger mechanism 204 is implemented as a reserved word or keyword for the .NET programming language, the reserved word or keyword may be specified as follows:
await for each (Result Type result in parallel (Func: ResultType=>{user logic}})

In accordance with such an embodiment, "user logic" represents the operations or tasks that are to be asynchronously processed in a parallel fashion, and "parallel" is the reserved word or keyword that is utilized to trigger the asynchronous, parallel processing of the operations or tasks in a parallel fashion. The "await for each" keywords are utilized to iterate though the async enumeration that is returned as a result. It is noted that the usage of "parallel" is purely exemplary and that trigger mechanism 104 may be represented as a different string of characters. It is also noted that the keyword "parallel" in this example is not to be confused with the .NET programming language "Parallel" class, which is utilized for implementing parallel loops.

In an embodiment in which trigger mechanism 104 is implemented as a method incorporated into the .NET programming language, the method may be specified as follows:
. . . AsyncParallelForeach(Func:ResultType=>{user logic})

In accordance with such an embodiment, "user logic" represents the operations or tasks that are to be asynchronously processed in a parallel fashion, and "AsyncParallelForeach" is the name of the method that is utilized to trigger the asynchronous, parallel processing of the operations or tasks in a parallel fashion. It is noted that the usage of "AsyncParallelForeach" is purely exemplary and that trigger mechanism 104 may be represented as a different string of characters.

Figure 3:
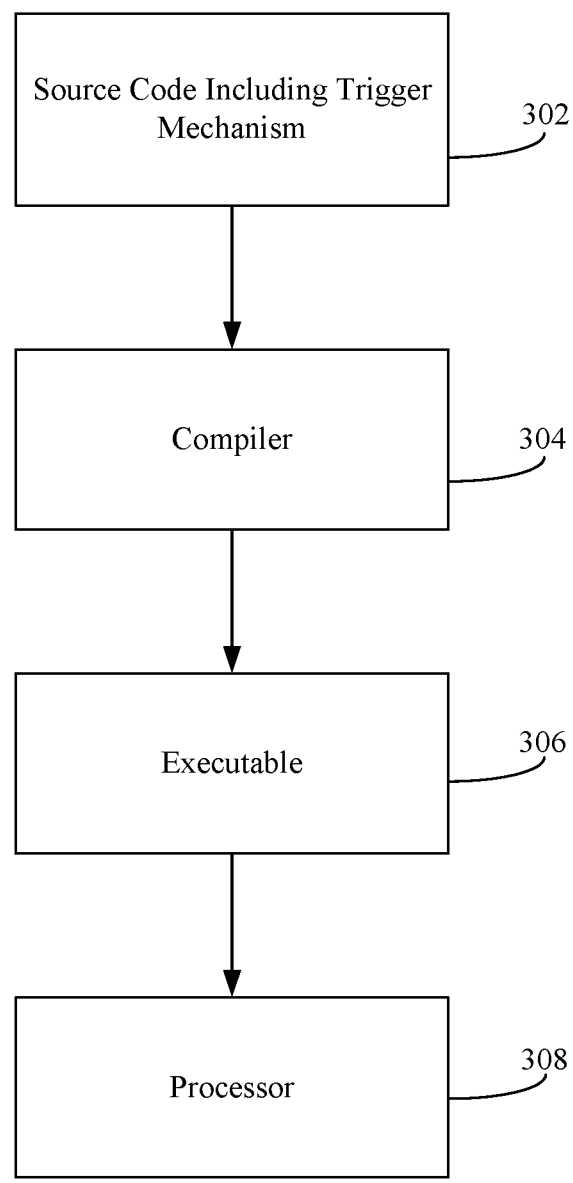
FIG. 3 is a high-level block diagram of an environment in which embodiments described herein may be implemented.

As mentioned elsewhere herein embodiments may be implemented in various environments. For instance, FIG. 3 is a high-level block diagram of an environment 300 in which embodiments described herein may be implemented. As shown in FIG. 3, environment 300 includes source code 302 that includes a trigger mechanism as discussed above. Source code 302 may, be written, for example, in any of the Microsoft® .NET™ programming languages, such as Visual Basic .NET, C#, J#, F#, C++/CLI, or Jscript .NET, although the embodiments described herein are not so limited. Source code 302 may be developed, designed and/or edited using an Integrated Development Environment (IDE). The IDE may be associated, for example, with a more elaborate programming station such as a developer studio application or with a more basic tool such as a code text editor.

A compiler 304 receives and compiles source code 302 to generate an executable 306, wherein the executable comprises machine-readable code suitable for execution by a processor 308 (e.g., a central processing unit, a virtual machine, etc.). Processor 308 may be included in a computing device, such as a mobile computing device (e.g., a Microsoft® Surface® device, a personal digital assistant (PDA), a laptop computer, a notebook computer, a tablet computer such as an Apple iPad™, a netbook, a smart phone (such as an Apple iPhone, a phone implementing the Google® Android™ operating system, etc.)), a wearable computing device (e.g., a head-mounted device including smart glasses such as Google® Glass™, a virtual headset such as Oculus Rift® by Oculus VR, LLC or HoloLens® by Microsoft Corporation, etc.), a stationary computing device such as a desktop computer or PC (personal computer), an Internet-of-Things (IoT) device, etc.

In an embodiment in which environment 300 is part of the Microsoft® .NET™ Framework, the output of compiler 304 is code rendered in a platform-neutral language termed Common Intermediate Language (CIL), which is then compiled by a Just-in-Time (JIT) Compiler (not shown in FIG. 3) to generate executable 306. In accordance with an embodiment, compiler 304 includes logic for processing source code 302 to detect a trigger mechanism for asynchronously processing tasks in a parallel fashion within source code 302 and for generating machine-readable code corresponding to the trigger mechanism.

Figure 4:
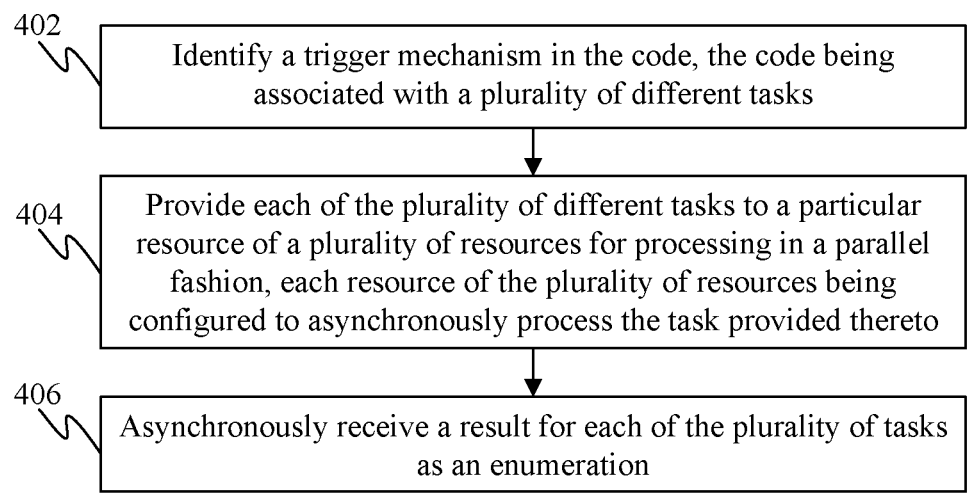
FIG. 4 depicts a flowchart of a method implemented by a processor for processing code that includes a trigger mechanism for asynchronously processing tasks in a parallel fashion in accordance with an example embodiment.

Accordingly, code may asynchronously process tasks in a parallel fashion based on a trigger mechanism in many ways. In particular, FIG. 4 depicts a flowchart 400 of a method implemented by processor 308 for processing code that includes a trigger mechanism for asynchronously processing tasks in a parallel fashion in accordance with an example embodiment. Although the method of flowchart 400 will be described herein in reference to system 200 of FIG. 2 and example environment 300 of FIG. 3, these methods are not limited to that implementation.

As shown in FIG. 4, the method of flowchart 400 begins at step 402, in which a trigger mechanism in code associated with a computer program is identified, the code being associated with a plurality of tasks. For example, with reference to FIG. 3, processor 308 identifies the trigger mechanism in executable 306.

In accordance with one or more embodiments, the trigger mechanism comprises a programming language keyword or reserved word.

In accordance with one or more embodiments, the trigger mechanism comprises a method call that receives the plurality of different tasks as an input.

At step 404, responsive to identifying the trigger mechanism, each of the plurality of different tasks are provided to a particular resource of a plurality of resources for processing in a parallel fashion. Each resource of the plurality of resources are configured to asynchronously process the task provided thereto. For example, with reference to FIG. 3, processor 308 provides each of the plurality of different tasks (e.g., tasks 212A-212D, as shown in FIG. 2) to a particular resource of a plurality of resources (e.g., resources 206A-206D, as shown in FIG. 2) for processing in a parallel fashion. As shown in FIG. 2, each of resources 206A-206D is configured to asynchronously process its respective task of tasks 212A-212D.

In accordance with one or more embodiments, each resource comprises a compute node of a cloud-based environment. For example, with reference to FIG. 2, each of resources 206A-206D comprises a compute node of a cloud-based environment.

In accordance with one or more embodiments, each resource comprises a computing thread. For example, with reference to FIG. 2, each of resources 206A-206D comprises a computing thread.

In accordance with one or more embodiments, each resource of the plurality of resources is configured to asynchronously pass data associated with a particular task to another resource of the plurality of resources. For example, with reference to FIG. 2, each of resources 206A-206D is configured to asynchronously pass data associated with a particular task to another resource of resources 206A-206D.

In accordance with one or more embodiments, a data structure shared by the plurality of resources is utilized to asynchronously pass the data associated with the particular task to the other resource. For example, with reference to FIG. 2, data structure 210 shared by resources 206A-206D is utilized to asynchronously pass the data associated with the particular task to the other resource.

At step 406, a result for each of the plurality of tasks is asynchronously received as an enumeration. For example, with reference to FIG. 3, processor 308 is configured to asynchronously receive a result for each of the plurality of tasks as an enumeration.

III. Example Alternative Implementations

In accordance with an alternative implementation of the present embodiments, rather than using language keywords or methods as described above, custom attribute annotations may be used as a trigger mechanism that enables computing operations or tasks to be performed asynchronously and in a parallel fashion. As will be appreciated by persons skilled in the relevant art(s), custom attribute annotations are pieces of declarative information attached by a software developer to entities within a computer program, which are then retrieved at runtime. Such custom attribute annotations are supported, for example, by the Microsoft® .NET™ framework or the Sun Microsystems® Java Virtual Machine (JVM™).

In accordance with another alternative embodiment, the steps performed by processor 308 as described above in reference to flowchart 400 of FIG. 4 are instead performed by a virtual machine.

Figure 5:
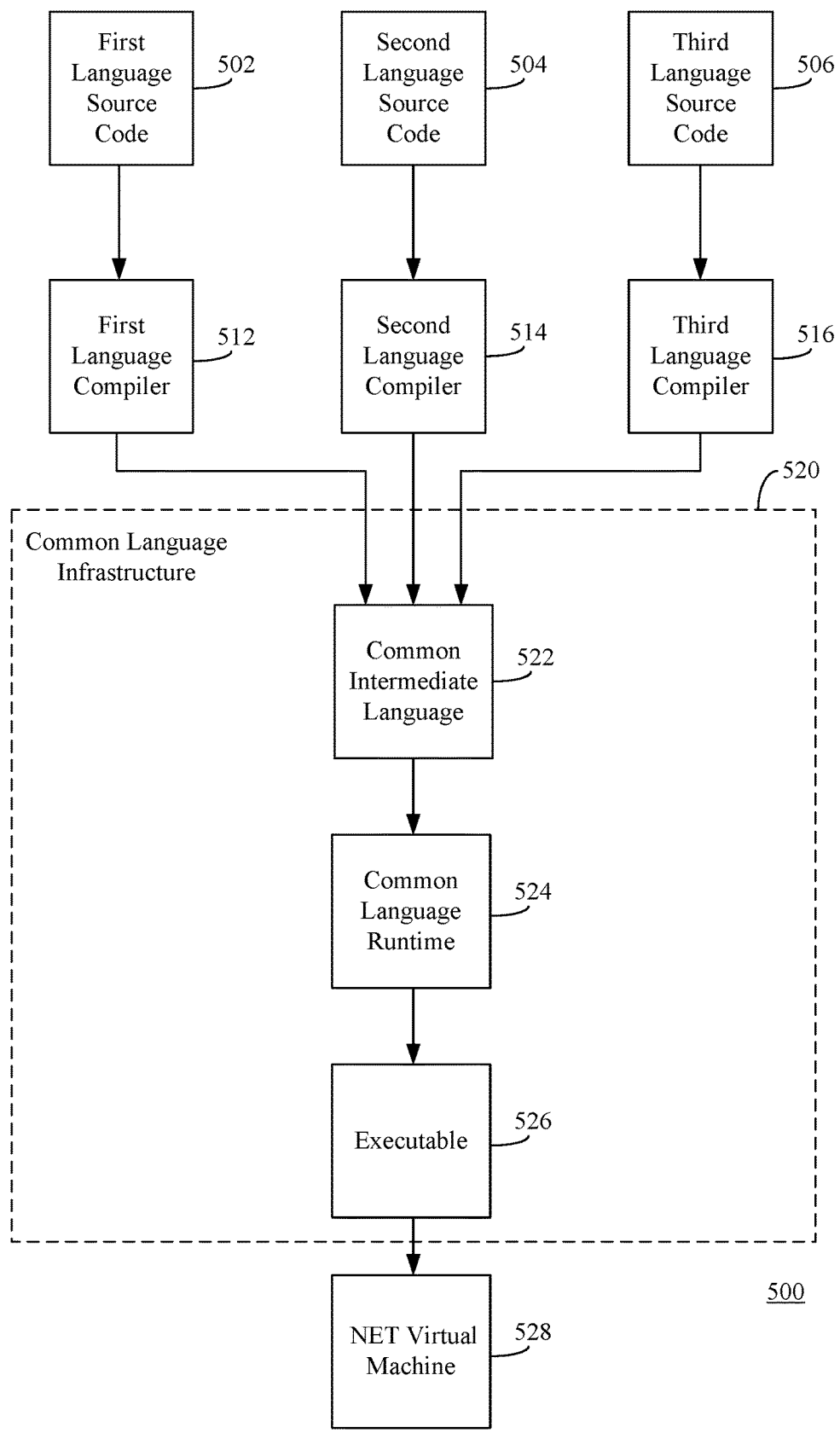
FIG. 5 depicts an environment that is consistent with a common language infrastructure in accordance with an example embodiment.

An example of such an embodiment is depicted in FIG. 5, which depicts an environment 500 that is consistent with a common language infrastructure 520. The Microsoft® .NET™ framework is an example implementation of common language infrastructure 520. As shown in FIG. 5, an environment 500 includes a first language compiler 512 that is configured to compile first language source code 502 to a platform-neutral language called Common Intermediate Language (CIL) 522, a second language compiler 514 that is configured to compile second language source code 504 to CIL 522, and a third language compiler 516 that is configured to compile third language source code 506 to CIL 522. The first language, second language and third language are intended to represent different programming languages, such as different Microsoft® .NET™ programming languages, which include, by way of example, Visual Basic .NET, C#, J#, C++/CLI, or Jscript .NET.

As further shown in FIG. 5, environment 500 further includes a Common Language Runtime (CLR) 524 that includes one or more components configured to compile CIL code 522 received from one or more of compilers 512, 514 and 516 to generate a machine-readable executable 526 that can be executed by a .NET virtual machine 526. In accordance with such an embodiment, virtual machine 528 is configured to perform the steps of flowchart 400.

IV. Example Mobile and Stationary Device Embodiments

The systems and methods described above, including the trigger mechanism for enabling operations or tasks to be performed asynchronously and in a parallel fashion in reference to FIGS. 1-5, data source(s) 208, resources 206A-206D, data structure 210, trigger mechanism 204, compiler 304, processor 308, first language compiler 512, second language compiler 514, third language compiler 516, and virtual machine 528, and/or each of the components described therein, and flowchart 400 may be implemented in hardware, or hardware combined with one or both of software and/or firmware. For example, data source(s) 208, resources 206A-206D, data structure 210, trigger mechanism 204, compiler 304, processor 308, first language compiler 512, second language compiler 514, third language compiler 516, and virtual machine 528, and/or each of the components described therein, and flowchart 400 may be each implemented as computer program code/instructions configured to be executed in one or more processors and stored in a computer readable storage medium. Alternatively, data source(s) 208, resources 206A-206D, data structure 210, trigger mechanism 204, compiler 304, processor 308, first language compiler 512, second language compiler 514, third language compiler 516, and virtual machine 528, and/or each of the components described therein, and flowchart 400 may be implemented as hardware logic/electrical circuitry. In an embodiment, data source(s) 208, resources 206A-206D, data structure 210, trigger mechanism 204, compiler 304, processor 308, first language compiler 512, second language compiler 514, third language compiler 516, and virtual machine 528, and/or each of the components described therein, and flowchart 400 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 6:
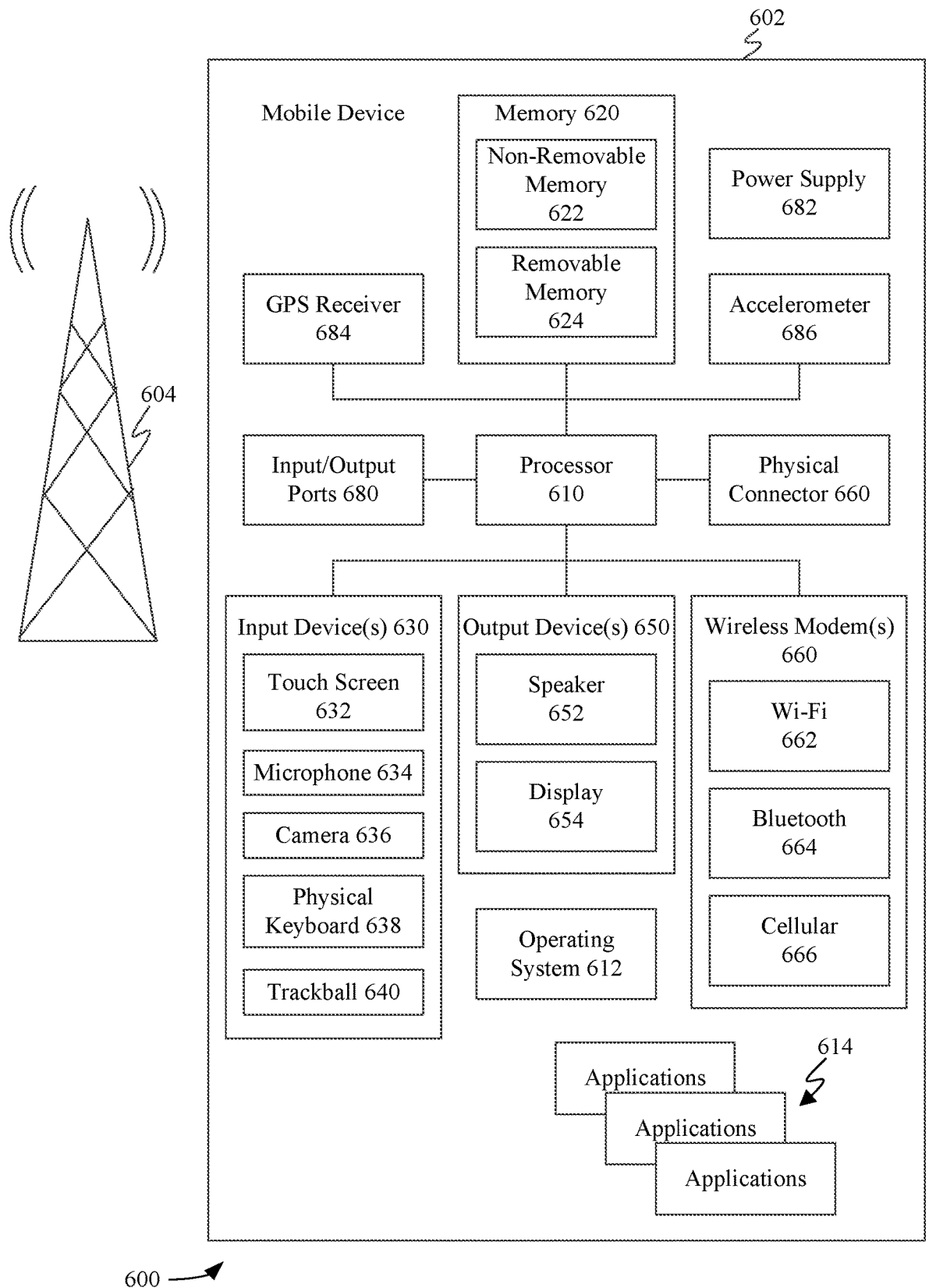
FIG. 6 is a block diagram of an exemplary user device in which embodiments may be implemented.

FIG. 6 shows a block diagram of an exemplary mobile device 600 including a variety of optional hardware and software components, shown generally as components 602. Any number and combination of the features/elements of data source(s) 208, resources 206A-206D, data structure 210, trigger mechanism 204, compiler 304, processor 308, first language compiler 512, second language compiler 514, third language compiler 516, and virtual machine 528, and/or each of the components described therein, and flowchart 400 may be implemented as components 602 included in a mobile device embodiment, as well as additional and/or alternative features/elements, as would be known to persons skilled in the relevant art(s). It is noted that any of components 602 can communicate with any other of components 602, although not all connections are shown, for ease of illustration. Mobile device 600 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 604, such as a cellular or satellite network, or with a local area or wide area network.

The illustrated mobile device 600 can include a controller or processor referred to as processor circuit 610 for performing such tasks as signal coding, image processing, data processing, input/output processing, power control, and/or other functions. Processor circuit 610 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 610 may execute program code stored in a computer readable medium, such as program code of one or more applications 614, operating system 612, any program code stored in memory 620, etc. Operating system 612 can control the allocation and usage of the components 602 and support for one or more application programs 614 (a.k.a. applications, "apps", etc.). Application programs 614 can include common mobile computing applications (e.g., email applications, calendars, contact managers, web browsers, messaging applications) and any other computing applications (e.g., word processing applications, mapping applications, media player applications).

As illustrated, mobile device 600 can include memory 620. Memory 620 can include non-removable memory 622 and/or removable memory 624. The non-removable memory 622 can include RAM, ROM, flash memory, a hard disk, or other well-known memory storage technologies. The removable memory 624 can include flash memory or a Subscriber Identity Module (SIM) card, which is well known in GSM communication systems, or other well-known memory storage technologies, such as "smart cards." The memory 620 can be used for storing data and/or code for running operating system 612 and applications 614. Example data can include web pages, text, images, sound files, video data, or other data sets to be sent to and/or received from one or more network servers or other devices via one or more wired or wireless networks. Memory 620 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 620. These programs include operating system 612, one or more application programs 614, and other program modules and program data. Examples of such application programs or program modules may include, for example, computer program logic (e.g., computer program code or instructions) for implementing the systems described above, including the embodiments described in reference to FIGS. 1-5.

Mobile device 600 can support one or more input devices 630, such as a touch screen 632, microphone 634, camera 636, physical keyboard 638 and/or trackball 640 and one or more output devices 650, such as a speaker 652 and a display 654.

Other possible output devices (not shown) can include piezoelectric or other haptic output devices. Some devices can serve more than one input/output function. For example, touch screen 632 and display 654 can be combined in a single input/output device. The input devices 630 can include a Natural User Interface (NUI).

Wireless modem(s) 660 can be coupled to antenna(s) (not shown) and can support two-way communications between processor circuit 610 and external devices, as is well understood in the art. The modem(s) 660 are shown generically and can include a cellular modem 666 for communicating with the mobile communication network 604 and/or other radio-based modems (e.g., Bluetooth 664 and/or Wi-Fi 662). Cellular modem 666 may be configured to enable phone calls (and optionally transmit data) according to any suitable communication standard or technology, such as GSM, 3G, 4G, 5G, etc. At least one of the wireless modem(s) 660 is typically configured for communication with one or more cellular networks, such as a GSM network for data and voice communications within a single cellular network, between cellular networks, or between the mobile device and a public switched telephone network (PSTN).

Mobile device 600 can further include at least one input/output port 680, a power supply 682, a satellite navigation system receiver 684, such as a Global Positioning System (GPS) receiver, an accelerometer 686, and/or a physical connector 660, which can be a USB port, IEEE 1394 (FireWire) port, and/or RS-232 port. The illustrated components 602 are not required or all-inclusive, as any components can be not present and other components can be additionally present as would be recognized by one skilled in the art.

Figure 7:
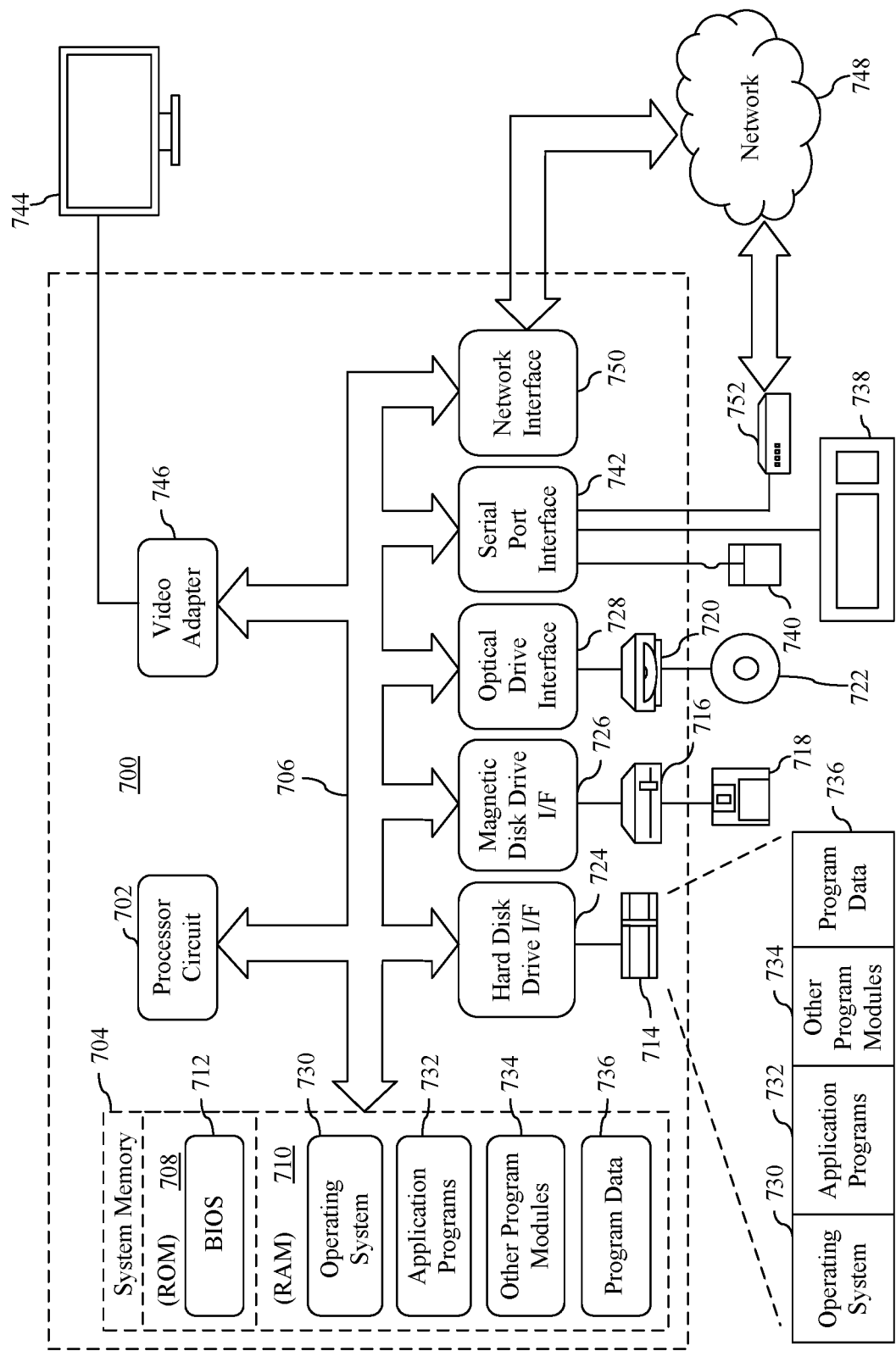
FIG. 7 is a block diagram of an example processor-based computer system that may be used to implement various embodiments.

Furthermore, FIG. 7 depicts an exemplary implementation of a computing device 700 in which embodiments may be implemented, including data source(s) 208, resources 206A-206D, data structure 210, trigger mechanism 204, compiler 304, processor 308, first language compiler 512, second language compiler 514, third language compiler 516, and virtual machine 528, and/or each of the components described therein, and flowchart 400. The description of computing device 700 provided herein is provided for purposes of illustration, and is not intended to be limiting. Embodiments may be implemented in further types of computer systems, as would be known to persons skilled in the relevant art(s).

As shown in FIG. 7, computing device 700 includes one or more processors, referred to as processor circuit 702, a system memory 704, and a bus 706 that couples various system components including system memory 704 to processor circuit 702. Processor circuit 702 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 702 may execute program code stored in a computer readable medium, such as program code of operating system 730, application programs 732, other programs 734, etc. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computing device 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 730, one or more application programs 732, other programs 734, and program data 736. Application programs 732 or other programs 734 may include, for example, computer program logic (e.g., computer program code or instructions) for implementing the systems described above, including the embodiments described above with reference to FIGS. 1-5.

A user may enter commands and information into the computing device 700 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to, or incorporated in computing device 700. Display screen 744 may display information, as well as being a user interface for receiving user commands and/or other information (e.g., by touch, finger gestures, virtual keyboard, etc.). In addition to display screen 744, computing device 700 may include other peripheral output devices (not shown) such as speakers and printers.

Computing device 700 is connected to a network 748 (e.g., the Internet) through an adaptor or network interface 750, a modem 752, or other means for establishing communications over the network. Modem 752, which may be internal or external, may be connected to bus 706 via serial port interface 742, as shown in FIG. 7, or may be connected to bus 706 using another interface type, including a parallel interface.

As used herein, the terms "computer program medium," "computer-readable medium," and "computer-readable storage medium" are used to generally refer to physical hardware media such as the hard disk associated with hard disk drive 714, removable magnetic disk 718, removable optical disk 722, other physical hardware media such as RAMs, ROMs, flash memory cards, digital video disks, zip disks, MEMs, nanotechnology-based storage devices, and further types of physical/tangible hardware storage media (including system memory 704 of FIG. 7). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 732 and other programs 734) may be stored on the hard disk, magnetic disk, optical disk, ROM, RAM, or other hardware storage medium. Such computer programs may also be received via network interface 750, serial port interface 752, or any other interface type. Such computer programs, when executed or loaded by an application, enable computing device 700 to implement features of embodiments discussed herein. Accordingly, such computer programs represent controllers of the computing device 700.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

V. Additional Example Embodiments

A method implemented by a processor for processing code associated with a computer program is described herein. The method comprises: identifying a trigger mechanism in the code, the code being associated with a plurality of different tasks; and responsive to identifying the trigger mechanism; providing each of the plurality of different tasks to a particular resource of a plurality of resources for processing in a parallel fashion, each resource of the plurality of resources being configured to asynchronously process the task provided thereto; and asynchronously receiving a result for each of the plurality of tasks as an enumeration.

In one embodiment of the foregoing method, each resource of the plurality of resources is configured to asynchronously pass data associated with a particular task to another resource of the plurality of resources.

In one embodiment of the foregoing method, the method further comprises: providing an address of the first page to the instance of the second browser via a first communication channel established between the first browser and the instance of the second browser.

In one embodiment of the foregoing method, a data structure shared by the plurality of resources is utilized to asynchronously pass the data associated with the particular task to the other resource.

In one embodiment of the foregoing method, each resource comprises a computing thread.

In one embodiment of the foregoing method, each resource comprises a compute node of a cloud-based environment.

In one embodiment of the foregoing method, the trigger mechanism comprises a programming language keyword.

In one embodiment of the foregoing method, the trigger mechanism comprises a method call that receives the plurality of different tasks as an input.

A system is also described herein. The system includes a memory that stores code associated with a computer program; and a component coupled to the memory, the component configured to: identify a trigger mechanism in the code, the code being associated with a plurality of different tasks; and responsive to identifying the trigger mechanism; provide each of the plurality of different tasks to a particular resource of a plurality of resources for processing in a parallel fashion, each resource of the plurality of resources being configured to asynchronously process the task provided thereto; and asynchronously receive a result for each of the plurality of tasks as an enumeration.

In one embodiment of the foregoing system, each resource of the plurality of resources is configured to asynchronously pass data associated with a particular task to another resource of the plurality of resources.

In one embodiment of the foregoing system, a data structure shared by the plurality of resources is utilized to asynchronously pass the data associated with the particular task to the other resource.

In one embodiment of the foregoing system, each resource comprises a computing thread.

In one embodiment of the foregoing system, each resource comprises a compute node of a cloud-based environment.

In one embodiment of the foregoing system, the trigger mechanism comprises a programming language keyword.

In one embodiment of the foregoing system, the trigger mechanism comprises a method call that receives the plurality of different tasks as an input.

In one embodiment of the foregoing system, the component comprises at least one of: a processor; or a virtual machine.

A computer-readable storage medium having program instructions recorded thereon that, when executed by at least one processor of a computing device, perform a method. The method includes: identifying a trigger mechanism in the code, the code being associated with a plurality of different tasks; and responsive to identifying the trigger mechanism; providing each of the plurality of different tasks to a particular resource of a plurality of resources for processing in a parallel fashion, each resource of the plurality of resources being configured to asynchronously process the task provided thereto; and asynchronously receiving a result for each of the plurality of tasks as an enumeration.

In one embodiment of the foregoing computer-readable storage medium, each resource of the plurality of resources is configured to asynchronously pass data associated with a particular task to another resource of the plurality of resources.

In one embodiment of the foregoing computer-readable storage medium, a data structure shared by the plurality of resources is utilized to asynchronously pass the data associated with the particular task to the other resource.

In one embodiment of the foregoing computer-readable storage medium, each resource comprises a computing thread.

In one embodiment of the foregoing computer-readable storage medium, each resource comprises a compute node of a cloud-based environment.

VI. Conclusion

While various embodiments have been described above, it should be understood that they have been presented by way of example only, and not limitation. It will be understood by those skilled in the relevant art(s) that various changes in form and details may be made therein without departing from the spirit and scope of the described embodiments as defined in the appended claims. Accordingly, the breadth and scope of the present embodiments should not be limited by any of the above-described exemplary embodiments, but should be defined only in accordance with the following claims and their equivalents.

What is claimed is:

1. A method implemented by a processor for processing code associated with a computer program, comprising:
    identifying a trigger mechanism in the code, the trigger mechanism being associated with a plurality of tasks in the code;
    responsive to identifying the trigger mechanism:
        providing each task of the plurality of tasks to a resource of a plurality of resources for processing in parallel, each resource of the plurality of resources being configured to asynchronously process the task provided thereto such that the resource is configured to concurrently process the task provided thereto and another task;
        receiving a result for each task of the plurality of tasks, for storage in a data structure, upon completion of the task; and
        creating an enumerated list that is populated asynchronously based on an order in which the result for each task is received.

2. The method of claim 1, wherein each resource of the plurality of resources is configured to asynchronously pass data associated with a particular task to another resource of the plurality of resources.

3. The method of claim 2, wherein the data structure is shared by the plurality of resources and the data structure is utilized to asynchronously pass the data associated with the particular task to the other resource.

4. The method of claim 1, wherein each resource comprises a computing thread.

5. The method of claim 1, wherein each resource comprises a compute node of a cloud-based environment.

6. The method of claim 1, wherein the trigger mechanism comprises a programming language keyword utilized to indicate the plurality of tasks are to be processed by the plurality of resources in parallel and asynchronously.

7. The method of claim 1, wherein the trigger mechanism comprises a method call that receives the plurality of tasks as an input.

8. A system, comprising:
- a memory that stores code associated with a computer program; and
- a component coupled to the memory, the component configured to:
  - identify a trigger mechanism in the code, the trigger mechanism being associated with a plurality of tasks in the code;
  - responsive to identifying the trigger mechanism:
    - provide each task of the plurality of different tasks to a resource of a plurality of resources for processing in parallel, each resource of the plurality of resources being configured to asynchronously process the task provided thereto such that the resource is configured to concurrently process the task provided thereto and another task;
    - receive a result for each task of the plurality of tasks, for storage in a data structure, upon completion of the task; and
    - create an enumerated list that is populated asynchronously based on an order in which the result for each task is received.

9. The system of claim 8, wherein each resource of the plurality of resources is configured to asynchronously pass data associated with a particular task to another resource of the plurality of resources.

10. The system of claim 9, wherein the data structure is shared by the plurality of resources and the data structure is utilized to asynchronously pass the data associated with the particular task to the other resource.

11. The system of claim 8, wherein each resource comprises a computing thread.

12. The system of claim 8, wherein each resource comprises a compute node of a cloud-based environment.

13. The system of claim 8, wherein the trigger mechanism comprises a programming language keyword utilized to indicate the plurality of tasks are to be processed by the plurality of resources in parallel and asynchronously.

14. The system of claim 8, wherein the trigger mechanism comprises a method call that receives the plurality of tasks as an input.

15. The system of claim 8, wherein the component comprises at least one of:
- a processor; or
- a virtual machine.

16. A computer-readable storage medium having program instructions recorded thereon that, when executed by at least one processor of a computing device, perform operations comprising:
- identifying a trigger mechanism in the code, the trigger mechanism being associated with a plurality of tasks in the code;
- responsive to identifying the trigger mechanism:
  - providing each task of the plurality of tasks to a resource of a plurality of resources for processing in parallel, each resource of the plurality of resources being configured to asynchronously process the task provided thereto such that the resource is configured to concurrently process the task provided thereto and another task;
  - receiving a result for each task of the plurality of tasks, for storage in a data structure, upon completion of the task; and
  - creating an enumerated list that is populated asynchronously based on an order in which the result for each task is received.

17. The computer-readable storage medium of claim 16, wherein each resource of the plurality of resources is configured to asynchronously pass data associated with a particular task to another resource of the plurality of resources.

18. The computer-readable storage medium of claim 17, wherein the data structure is shared by the plurality of resources and the data structure is utilized to asynchronously pass the data associated with the particular task to the other resource.

19. The computer-readable storage medium of claim 16, wherein each resource comprises a computing thread or a compute node of a cloud-based environment.

20. The computer-readable storage medium of claim 16, wherein the trigger mechanism comprises a programming language keyword utilized to indicate the plurality of tasks are to be processed by the plurality of resources in parallel and asynchronously.

* * * * *